US009197098B2

(12) United States Patent
Frampton et al.

(10) Patent No.: US 9,197,098 B2
(45) Date of Patent: Nov. 24, 2015

(54) STANDBY POWER SYSTEM THAT PREDICTS A NEED TO SUPPLY POWER TO A LOAD TO MINIMIZE START TIME OF A GENERATOR (75) Inventors: Isaac S. Frampton, Strattanville, PA (US); Douglas W. Dorn, Sheboygan Falls, WI (US); Richard A. Mauk, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 183 days.

(21) Appl. No.: 13/540,118

(22) Filed: Jul. 2, 2012

(65) Prior Publication Data

US 2014/0002032 A1  Jan. 2, 2014

(51) Int. Cl.
*H02P 9/00* (2006.01)
*H02J 9/00* (2006.01)
*H02J 9/06* (2006.01)
*H02J 9/08* (2006.01)

(52) U.S. Cl.
CPC ... *H02J 9/00* (2013.01); *H02J 9/06* (2013.01); *H02J 9/08* (2013.01); *H02J 2009/068* (2013.01)

(58) Field of Classification Search
CPC ............ H02J 2003/001; H02J 2003/003; H02J 2003/007; H02J 9/00; H02J 9/04; H02J 9/06; H02J 9/08; H02J 2009/068
USPC .................. 322/10–13, 17–18, 44
See application file for complete search history.

(56) References Cited

U.S. PATENT DOCUMENTS

| 2,546,410 | A | 3/1951 | Schwendner et al. |
| 2,832,896 | A | 4/1958 | Stineman et al. |
| 3,300,647 | A | 1/1967 | Gogia et al. |
| 3,489,914 | A | 1/1970 | Taylor |
| 4,233,555 | A | 11/1980 | Roche |
| 4,302,683 | A | 11/1981 | Burton |

(Continued)

FOREIGN PATENT DOCUMENTS

| CN | 201781325 A | 3/2011 |
| EP | 1006641 A2 | 6/2000 |
| WO | WO-2012/154451 A2 | 11/2012 |

OTHER PUBLICATIONS

European Application No. 13003307.9, Extended European Search Report dated Sep. 26, 2013, 8 pgs.

(Continued)

*Primary Examiner* — Tulsidas C Patel
*Assistant Examiner* — Viet Nguyen
(74) *Attorney, Agent, or Firm* — Schwegman Lundberg & Woessner, P.A.

(57) ABSTRACT

Some embodiments relate to a standby power system. The standby power system includes a sensor that is adapted to monitor a primary power source which provides power to a load. In some embodiments, the sensor may monitor characteristics of the power supplied by the primary power source 12 that may be used to sense abnormalities. The standby power system further includes a generator that is also adapted to supply power to the load. As an example, the generator may include an internal combustion engine that drives an alternator. The standby power system further includes a generator controller that operates the generator and exchanges data with the sensor. The generator controller predicts a need to supply power to the load based on data received from the sensor. The generator controller then acts to minimize a time to availability of the generator based on the prediction.

11 Claims, 6 Drawing Sheets

(56) References Cited

U.S. PATENT DOCUMENTS

| | | | |
|---|---|---|---|
| 4,384,213 A * | 5/1983 | Bogel | 307/64 |
| 4,405,892 A | 9/1983 | Staerzl | |
| 4,469,071 A | 9/1984 | Bassi et al. | |
| 4,625,123 A | 11/1986 | Gillett et al. | |
| 4,899,706 A | 2/1990 | Sasaki | |
| 5,252,905 A | 10/1993 | Wills et al. | |
| 5,256,959 A | 10/1993 | Nagano et al. | |
| 5,332,927 A | 7/1994 | Paul et al. | |
| 5,625,276 A | 4/1997 | Scott et al. | |
| 5,635,768 A | 6/1997 | Birch et al. | |
| 5,694,027 A | 12/1997 | Satake et al. | |
| 5,703,410 A | 12/1997 | Maekawa | |
| 5,730,098 A | 3/1998 | Sasaki et al. | |
| 5,886,890 A | 3/1999 | Ishida et al. | |
| 6,191,500 B1 | 2/2001 | Toy | |
| 6,313,544 B1 * | 11/2001 | Mongia et al. | 290/52 |
| 6,605,878 B1 | 8/2003 | Arce | |
| 6,657,416 B2 * | 12/2003 | Kern et al. | 322/29 |
| 6,844,706 B2 | 1/2005 | Pinkerton, III et al. | |
| 6,894,403 B2 | 5/2005 | Shinogi | |
| 6,923,168 B2 | 8/2005 | Bryde | |
| 7,180,210 B1 | 2/2007 | Jorgenson et al. | |
| 8,049,348 B2 | 11/2011 | Czajkowski | |
| 2003/0014200 A1 * | 1/2003 | Jonker et al. | 702/60 |
| 2004/0059542 A1 | 3/2004 | Apostolides | |
| 2004/0164618 A1 | 8/2004 | Bryde | |
| 2005/0184589 A1 | 8/2005 | Fujita | |
| 2006/0244327 A1 | 11/2006 | Kundel | |
| 2007/0262661 A1 | 11/2007 | Ai | |
| 2009/0164806 A1 | 6/2009 | Dishman et al. | |
| 2010/0102637 A1 | 4/2010 | Dozier et al. | |
| 2010/0207454 A1 | 8/2010 | Jagota et al. | |
| 2010/0269776 A1 * | 10/2010 | Mizuno | 123/179.4 |
| 2011/0149624 A1 | 6/2011 | Yamanaka | |
| 2011/0272952 A1 * | 11/2011 | Richardson et al. | 290/1 A |
| 2011/0291411 A1 | 12/2011 | Folken | |
| 2012/0007431 A1 | 1/2012 | Jang et al. | |
| 2012/0242451 A1 | 9/2012 | Tanaka et al. | |
| 2014/0028102 A1 | 1/2014 | Frampton | |
| 2014/0210256 A1 | 7/2014 | Raats et al. | |
| 2015/0115745 A1 * | 4/2015 | Wang et al. | 307/130 |

OTHER PUBLICATIONS

European Application No. 13003307.9, Response filed Jul. 2, 2014 to European Sesrch Report dated Sep. 26, 2013, 17 pgs.

European Application No. 13003380.6, European Search Report dated Feb. 17, 2014, 9 pgs.

European Application No. 13003380.6, Response filed Sep. 17, 2014 to European Search Report dated Feb. 17, 2014, 18 pgs.

U.S. Appl. No. 13/559,643, Non Final Office Action mailed May 7, 2015, 13 pgs.

Chinese Application Serial No. 201310271829.0, Office Action mailed Feb. 27, 2015, (w/ English Translation), 19 pgs.

"Chinese Application Serial No. 201310261793.8, Office Action mailed Mar. 23, 2015", (w/ English Summary), 11 pgs.

"European Application Serial No. 15155923, Extended European Search Report mailed Aug. 7, 2015", 6 pgs.

* cited by examiner

Fig. 5

STANDBY POWER SYSTEM THAT PREDICTS A NEED TO SUPPLY POWER TO A LOAD TO MINIMIZE START TIME OF A GENERATOR

TECHNICAL FIELD

Embodiments pertain to a standby power system, and more particularly to a standby power system that predicts a need to supply power to a load based on data received from a sensor and acts to minimize start time of a generator.

BACKGROUND

Electric generators are typically used to provide electrical power. One common use of electric generators is as a standby power source. A standby power source typically provides power to a load when a primary power source is unable to power the load.

One common type of electric generator includes an internal combustion engine. The internal combustion engine drives an electrical alternator that produces alternating electricity.

Existing standby generator systems utilize an automatic transfer switch (ATS) to monitor the primary power source. The ATS determines that the primary power source is unavailable to provide power to the load, and provides a signal to the standby power source that it should start. Once the standby power source receives this signal, it will initiate a start sequence for the standby power source.

One of the drawbacks with such existing standby power systems is that there is typically a delay between the primary power source becoming unavailable and the standby power source becoming available. One factor causing the delay is that there is typically a gap in time to determine that the primary source is unavailable. This delay is utilized to avoid unnecessary starting of the standby power source when there is a momentary interruption in power provided by the primary power source.

Another factor causing the delay is that the starting sequence of engine driven generators takes valuable time. This delay can be especially problematic in standby power systems where the standby power source requires pre-start preparation. This pre-start preparation causes an increase in start time of the standby power source thereby extending the time that is load is without power.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
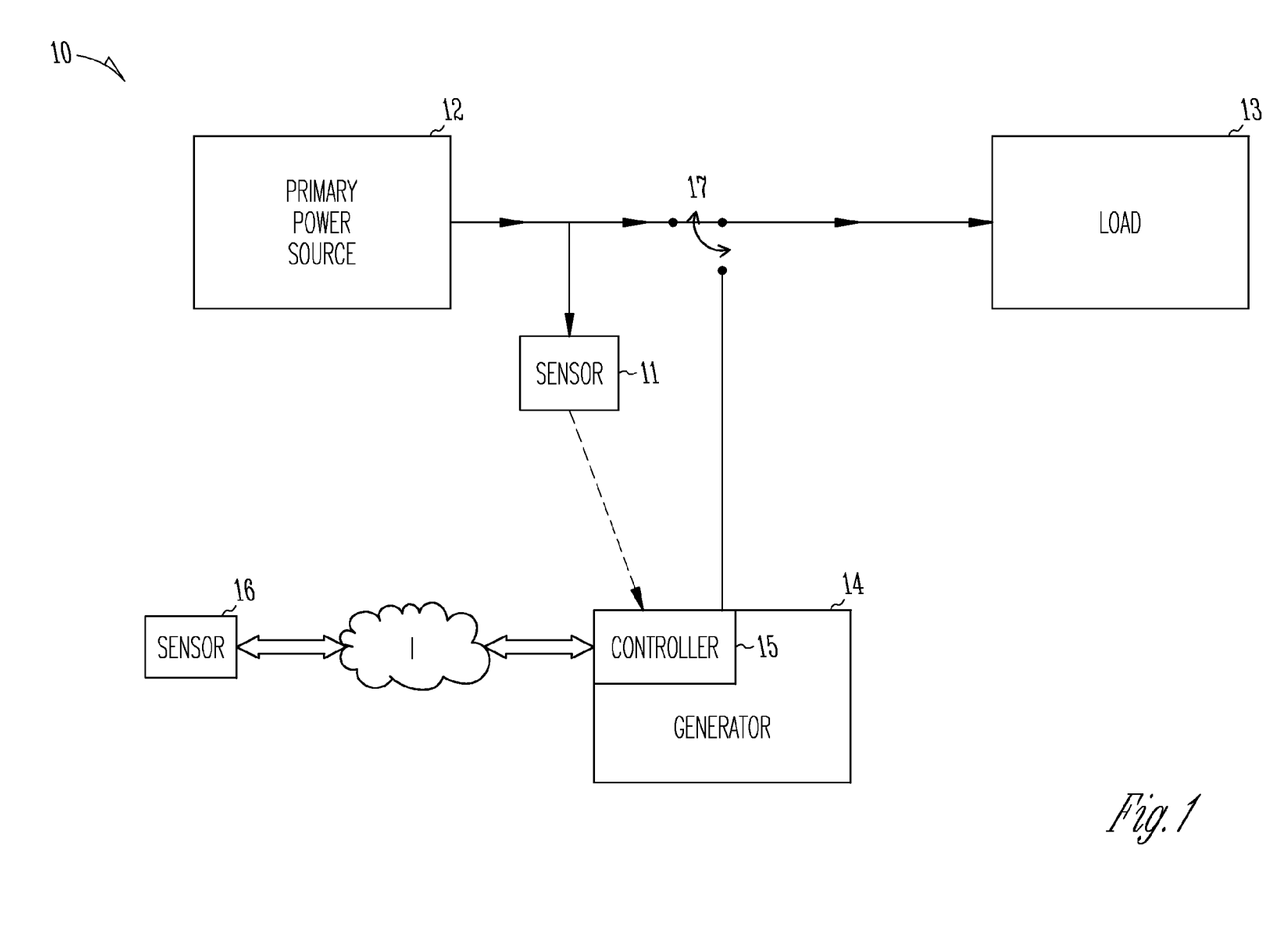
FIG. 1 is a schematic plan view of an example standby power system that includes a sensor where a primary power source is supplying power to a load.
Figure 2:
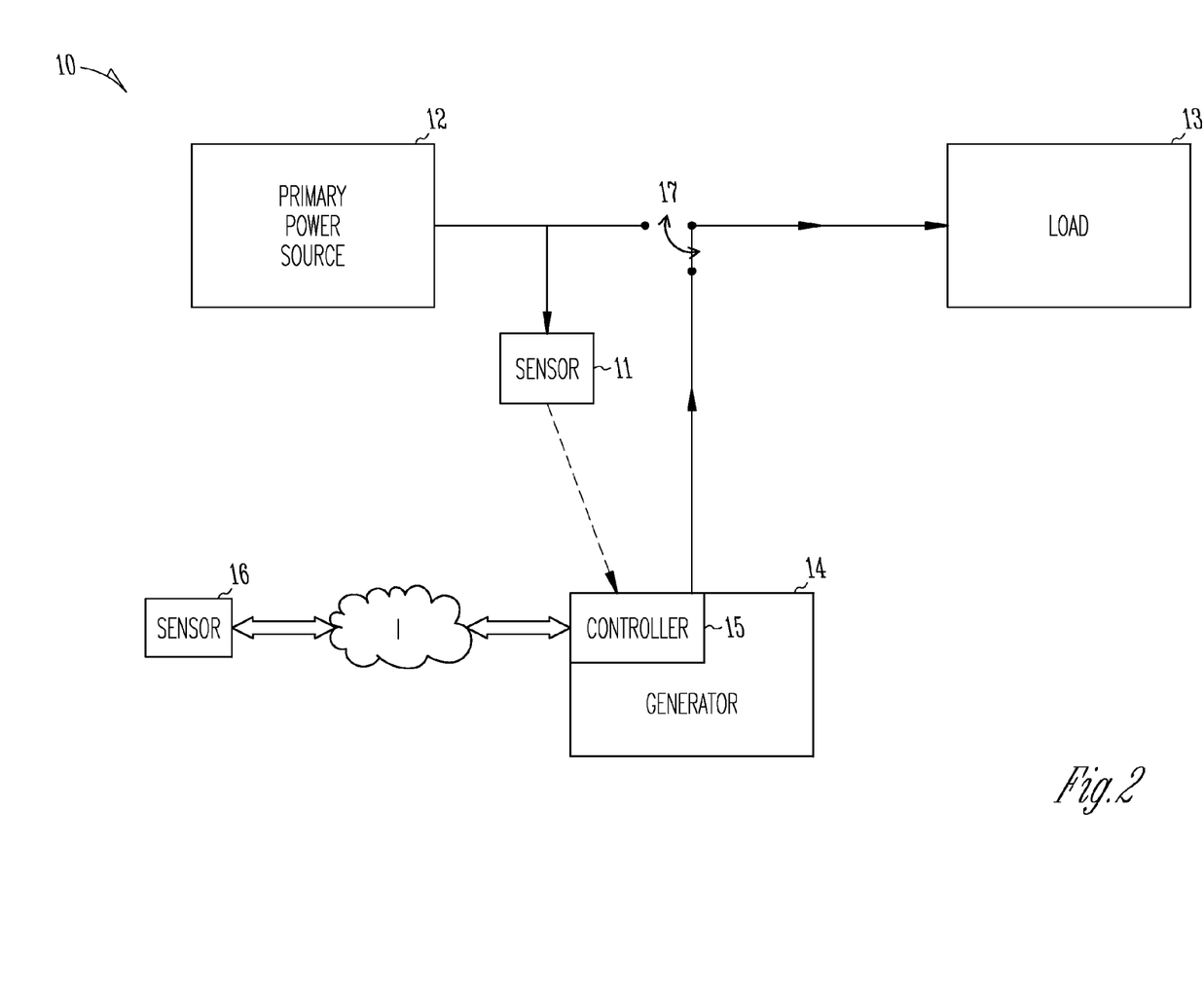
FIG. 2 shows the schematic plan view of FIG. 1 where a standby power source is supplying power to the load.

FIGS. 1-2 are schematic plan views of an example standby power system 10. The standby power system 10 includes a sensor 11 that is adapted to monitor a primary power source 12 that provides power to a load 13. In some embodiments, the sensor 11 may monitor characteristics of the power supplied by the primary power source 12 that may be used to sense abnormalities. As examples, the sensor 11 may monitor (i) the root mean squared voltage of the primary power source 12; and/or (ii) the zero sequence voltage of the primary power source 12.

The standby power system 10 further includes a generator 14 that is also adapted to supply power to the load 13 through switch 17. As an example, the generator 14 may include an internal combustion engine that drives an alternator.

FIG. 1 shows the standby power system 10 where the primary power source 12 is supplying power to the load 13 through switch 17. FIG. 2 shows the standby power system 10 where the standby power source 14 is supplying power to the load 13 through switch 17.

The standby power system 10 further includes a generator controller 15 that operates the generator 14 and exchanges data with the sensor 11. The generator controller 15 predicts a need to supply power to the load 13 based on data received from the sensor 11. The generator controller 15 then acts to minimize the time to availability of the generator 14 based on the prediction. The actions may include performing, pre-starting functions to minimize the start time of the generator 14.

Minimizing the start time of the generator 14 based on the prediction may reduce the amount of time during which the load 13 is not receiving power from either the primary source 12 or the generator 14. Decreasing the amount of time in which the load 13 is not supplied with power may allow for (i) the use of smaller uninterruptible power supplies; and/or (ii) reduced facility down time due to lack of power.

In some embodiments, the generator controller 15 may operate an oil pump (not shown) to lubricate mechanical components (not shown in the internal combustion engine in order to minimize start time of the generator 14 once the primary power source 12 is unable to provide power to the load 13. Operating the oil pump to lubricate the mechanical components may (i) allow quicker starting of the internal combustion engine; (ii) decrease wear on bearing surface thereby increasing the operating life of the internal combustion engine; and/or (iii) provide oil pressure to oil-actuated speed governors or fuel injection systems before generator 14 starting.

Embodiments are also contemplated where the generator controller 15 activates heating elements (not shown) that enhance combustion in the internal combustion engine in order to minimize start time of the generator 14 once it is determined that the generator 14 should be started. Heating elements may be used to (i) heat intake air that is used for combustion or (ii) preheat the combustion chamber. Heating intake air that is used for combustion may permit prompt compression-ignition of an air-fuel mix under cold conditions thereby permitting quicker starting under cold conditions.

In some embodiments, the generator controller 15 may operate air inlet louvers on an enclosure (not shown) for the generator 14 to permit the flow of combustion and cooling air to the generator 14 in order to minimize start time of the generator 14 once it is determined that the generator 14 should be started. Opening the air inlet louvers based on a predicted toss of power from the primary power source 12 may permit quicker starting of the generator 14 because the louvers may not be able to open while the generator 14 is cranking. The louvers may not be able to open while the generator 14 is cranking because (i) the louvers obtain power from generator cranking battery; and/or (ii) the air required by the generator 14 while cranking creates a pressure head that may prohibit the louvers from opening.

Embodiments are also contemplated where the generator controller 15 operates other starting aids. As an example, some type of fluid (e.g., ether, alternative fuels or some other fuel additive) may be injected for combustion to permit quicker starting of the internal combustion engine that is part of the generator 14. As another example, fuel preparation equipment (e.g., a fuel heater, pump or a fuel cooler) may be activated to improve starting of a combustion engine.

It should be noted that the standby power system 10 may further include a server 16 that allows exchanging information with the generator controller 15 and other devices on a network (e.g., the Internet I). At least one of the server devices 16 and the generator controller 15 may predict a need to supply power to the load 13 based on data received from the sensor 11.

Figure 3:
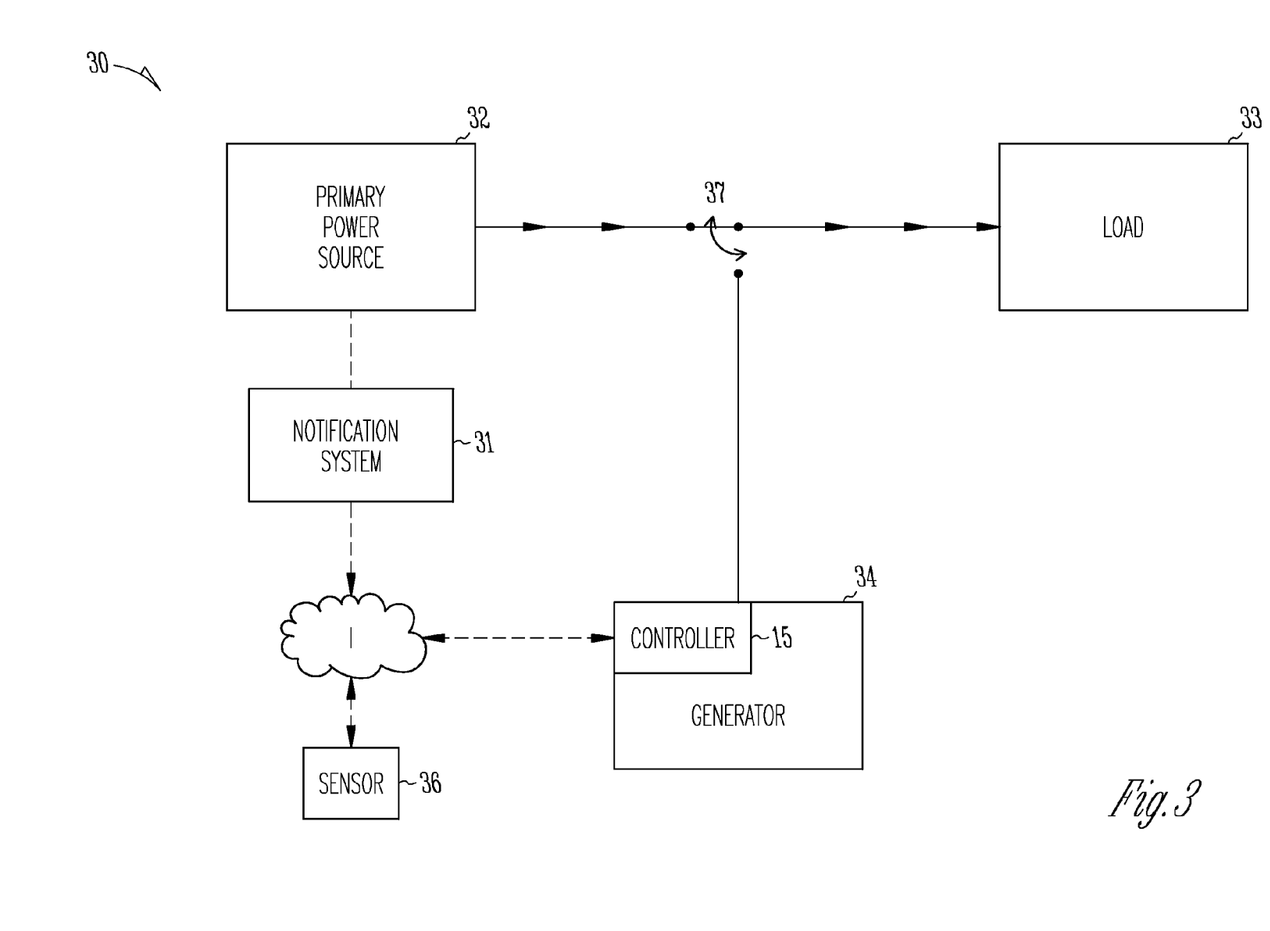
FIG. 3 is a schematic plan view of another example standby power system that includes a notification system where a primary power source is supplying power to a load.
Figure 4:
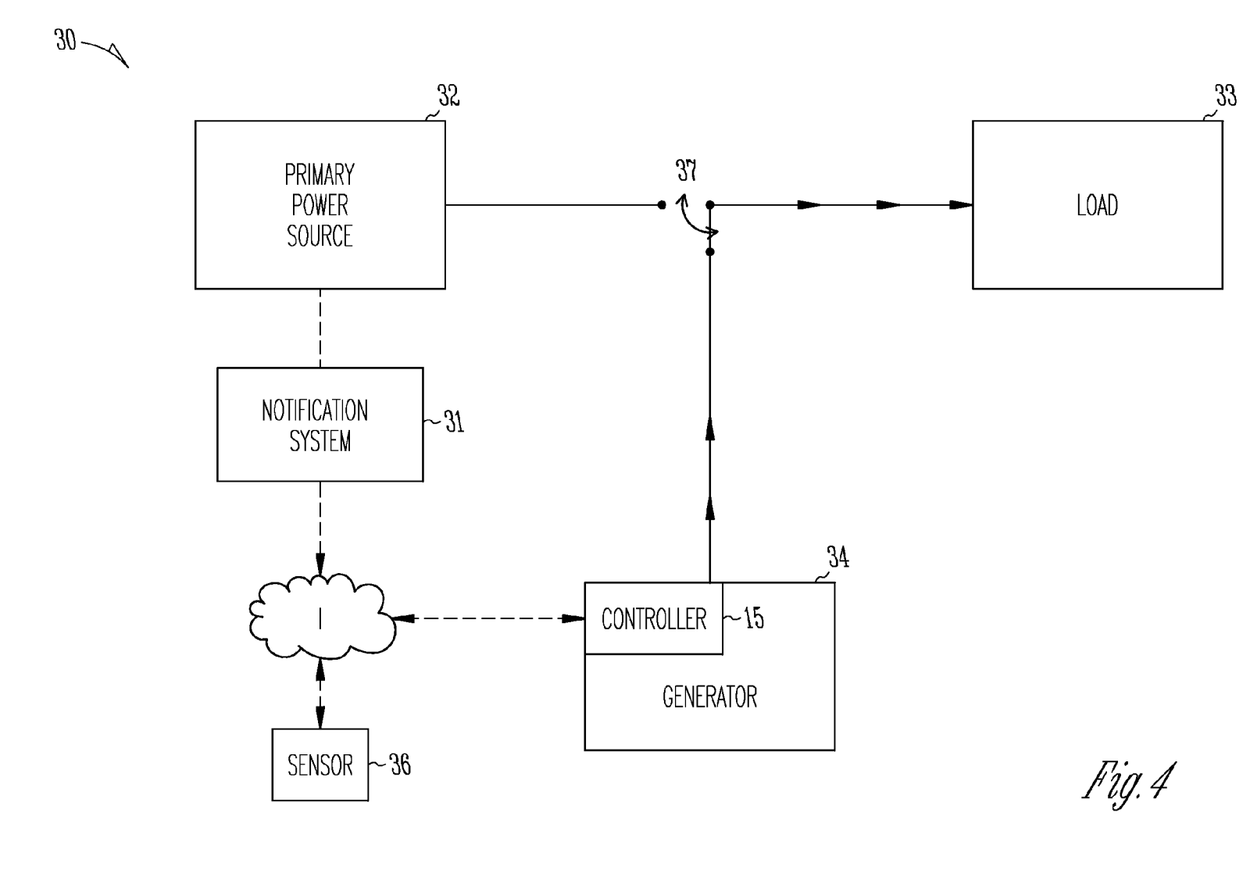
FIG. 4 shows the schematic plan view of FIG. 3 where a standby power source is supplying power to the load.

FIGS. 3-4 are schematic plan views of another example standby power system 30. The standby power system 30 includes a generator 34 that is adapted to supply standby power to a load 33. As an example, the generator 34 may include an internal combustion engine that drives an alternator.

The standby power system 30 further includes a notification system 31 that predicts a need for the generator 34 to supply standby power to the load 33. In some embodiments, the notification system 31 may monitor characteristics of power that is supplied by a primary power source 32. As an example, the notification system 31 may be used to sense abnormalities in the power that is supplied by the primary power source 32 to the load 33.

FIG. 3 shows the standby power system 30 where the primary power source 32 is supplying power to the load 33 through switch 37. FIG. 4 shows the standby power system 30 where the standby power source 34 is supplying power to the load 33 through switch 37.

The standby power system 30 further includes a generator controller 35 that operates the generator 34 and exchanges data with the notification system 31 via a network (e.g., the Internet I). The generator controller 35 predicts a need to supply power to the load 33 based on data received from the notification system 31 relating to power that is supplied by the primary power source 32. The generator controller 35 then acts to minimize a start time of the generator 34 based on the prediction.

Minimizing the start time of the generator 34 based on the prediction may reduce the amount of time during which the load 33 is not receiving power from either the primary source 32 or the generator 34. Decreasing the amount of time in which the load 33 is not supplied with power may allow for (i) the use of smaller uninterruptible power supplies; and/or (ii) reduced facility down time due to lack of power.

Similarly, as discussed above with regard to generator controller 15, the generator controller 35 may (i) operate an oil pump (not shown) to lubricate mechanical components (not shown) in the internal combustion engine in order to minimize start time of the generator 34 once the primary power source 32 is unable to provide power to the load 33; (ii) activate heating elements (not shown) that enhance combustion in the internal combustion engine in order to minimize start time of the generator 34 once the primary power source 32 is unable to provide power to the load 33; and/or (iii) operate air inlet louvers on an enclosure (not shown) for the generator 34 to permit the flow of combustion and cooling air to the generator 34 in order to minimize start time of the generator 34 once the primary power source 32 is unable to provide power to the load 33.

It should be noted that the standby power system 30 may further include a server 36 that exchanges information with the generator controller 35 via a network (e.g., the Internet I). At least one of the server 36 and the generator controller 35 may predict a need to supply power to the load 33 based on data received from the notification system 31 or other information available to the server 36.

Figure 5:
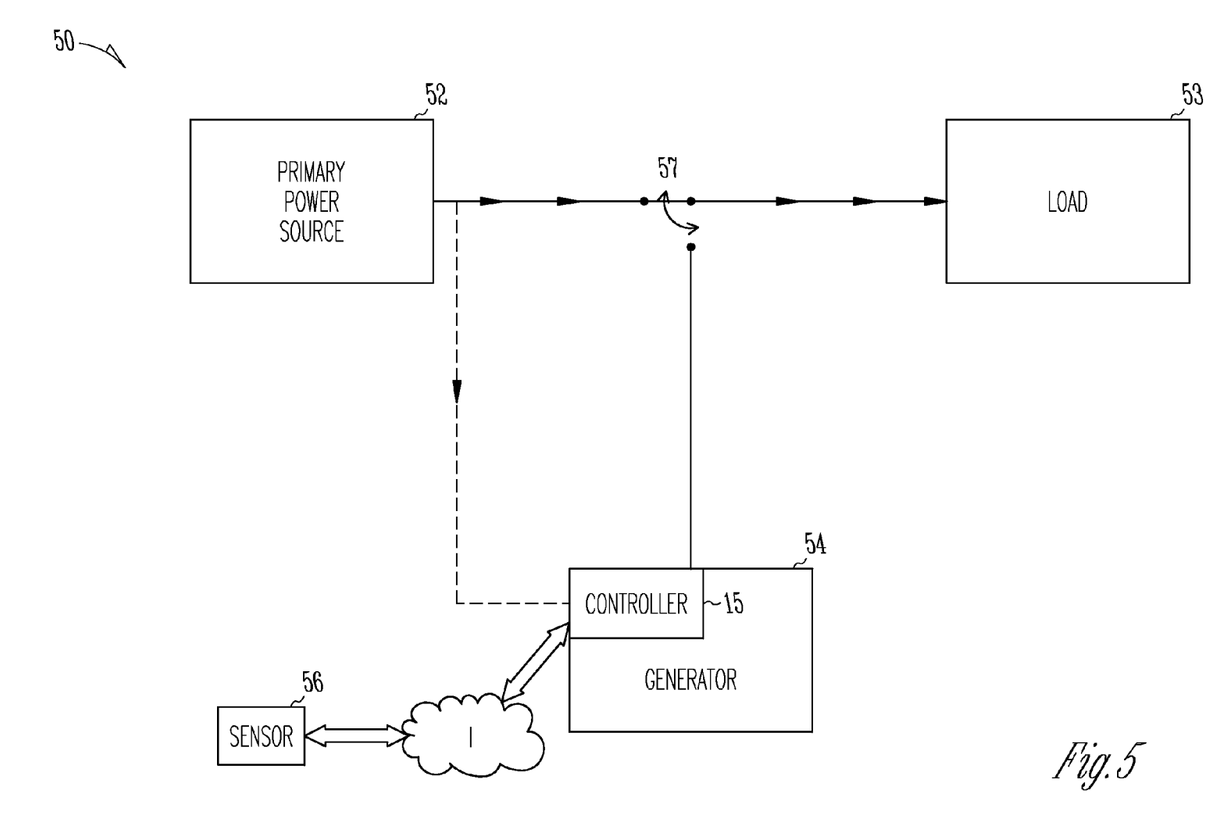
FIG. 5 is a schematic plan view of another example standby power system that includes a generator controller that monitors a primary power source which is supplying power to a load.
Figure 6:
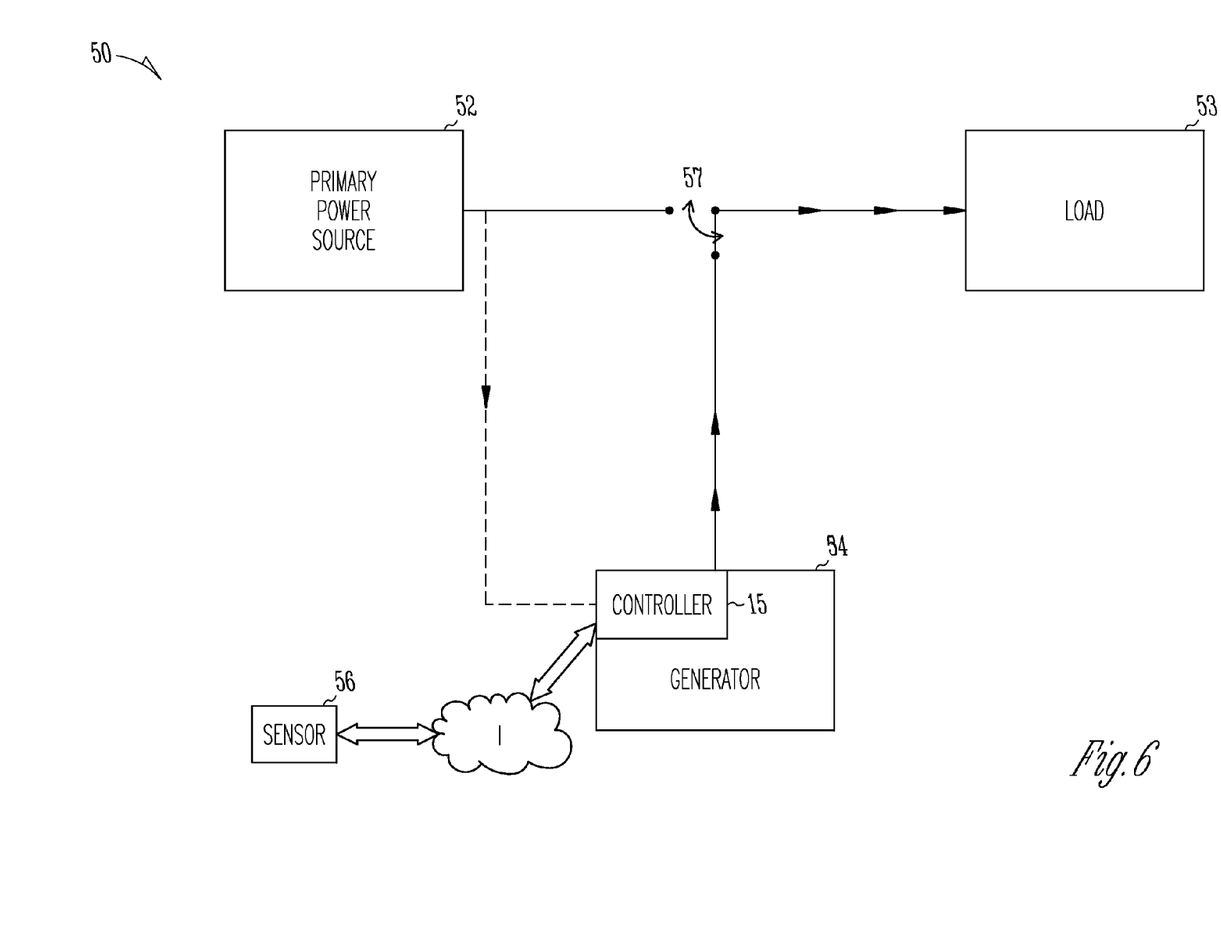
FIG. 6 shows the schematic plan view of FIG. 5 where a standby power source is supplying power to the load.

FIGS. 5-6 are schematic plan views of another example standby power system 50. The standby power system 50 includes a generator 54 that is adapted to supply standby power to a load 53. As an example, the generator 54 may include an internal combustion engine that drives an alternator.

The standby power system 50 further includes a controller 55 that monitors power that is provided to a load 53 by a primary power source 52. The controller 55 starts the generator 54 when the controller 55 anticipates a need for the generator 54 to supply power to the load 53.

In the example embodiment that is illustrated in FIGS. 5-6, the controller is a generator controller that may (or may not) be mounted on the generator 54. Embodiments area also contemplated where the controller is part of a transfer switch (see, e.g., switch 57 in FIGS. 5-6) that is included in the standby power system 50.

In some embodiments, the controller 55 may monitor characteristics of power that is supplied by a primary power source 52. As an example, the controller 55 may be used to sense abnormalities in the power that is supplied by the primary power source 52 to the load 53.

FIG. 5 shows the standby power system 50 where the primary source 52 is supplying power to the load 53 through switch 57. FIG. 6 shows the standby power system 50 where the standby power source 54 is supplying power to the load 53 through switch 57.

Minimizing the time to availability of the generator 54 based on the prediction may reduce the amount of time during which the load 53 is not receiving power from either the primary source 52 or the generator 54. Decreasing the amount of time in which the load 53 is not supplied with power may allow for (i) the use of smaller uninterruptible power supplies; and/or (ii) reduced facility down time due to lack of power.

Similarly as discussed above with regard to generator controllers 15, 35, the controller 55 may (i) operate an oil pump (not shown to lubricate mechanical components (not shown) in the internal combustion engine in order to minimize start time of the generator 54 once the primary power source 52 is unable to provide power to the load 53; (ii) activate heating elements (not shown) that enhance combustion in the internal combustion engine in order to minimize start time of the generator 54 once the primary power source 52 is unable to provide power to the load 53; and/or (iii) operate air inlet louvers on an enclosure (not shown) for the generator 54 to permit the flow of combustion and cooling air to the generator 54 in order to minimize start time of the generator 54 once the primary power source 52 is unable to provide power to the load 53.

It should be noted that the standby power system 50 may further include a server 56 that exchanges information with the generator controller 55 via a network (e.g., the Internet I).

At least one of the server 56 and the controller 55 may predict a need to supply power to the load 53 based on data collected by the controller relating to power supplied by the primary power source 52 (or other information available to the server 56).

The example standby power systems 10, 30, 50 described herein may serve to perform pre-start preparation for the standby power source. This pre-start preparation for the standby power source may permit quicker starting for the standby power source thereby minimizing the time that the load is in an undesirable unpowered state.

The Abstract is provided to comply with 37 C.F.R. Section 172(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A standby power system comprising:
   a sensor adapted to monitor a primary utility power source that provides power to a load;
   a generator that is adapted to supply power to the load, wherein the generator includes an internal combustion engine that drives an alternator; and
   a generator controller that operates the generator and receives data from the sensor, wherein the generator controller analyzes the data from the sensor such that the generator controller is configured to determine that there may be a potential loss of power from the primary utility power source, and wherein the generator controller acts to perform (i) operating an oil pump to lubricate mechanical components in the internal combustion engine, (ii) activating heating elements that enhance combustion in the internal combustion engine, (iii) operating air inlet louvers on an enclosure for the generator to permit the flow of combustion and cooling air to the internal combustion engine, (iv) injecting a fluid for combustion into the internal combustion engine to permit quicker starting of the internal combustion engine; or (v) activating fuel preparation equipment to improve starting of a combustion engine before there is a loss of power from the primary utility power source without starting the internal combustion engine in order to minimize a time to availability for the generator to supply power to the load when there is a loss of power from the primary utility power source.

2. The standby power system of claim 1, wherein the sensor monitors the root mean squared voltage of the primary utility power source.

3. The standby power system of claim 1, wherein the sensor monitors zero sequence voltage of the primary utility power source.

4. The standby power system of claim 1, further comprising a server that exchanges information with the generator controller via a network, wherein at least one of the server and the generator controller are configured to determine that there may be a potential loss of power from the primary utility power source based on data received from the sensor.

5. A standby power system comprising:
   a generator that is adapted to supply standby power to a load, wherein generator includes an internal combustion engine that drives an alternator;
   a notification system that monitors a characteristic of a primary utility power source such that the notification system is configured to determine that there may be a potential loss of power from the primary utility power source, the determination based on the monitored characteristic; and
   a generator controller that operates the generator and exchanges data with the notification system via a network, wherein the generator controller is configured to perform (i) operating an oil pump to lubricate mechanical components in the internal combustion engine, (ii) activating heating elements that enhance combustion in the internal combustion engine, (iii) operating air inlet louvers on an enclosure for the generator to permit the flow of combustion and cooling air to the internal combustion engine, (iv) injecting a fluid for combustion into the internal combustion engine to permit quicker starting of the internal combustion engine, or (v) activating fuel preparation equipment to improve starting of a combustion engine without starting the internal combustion engine in order to minimize a time to availability for the generator to supply power to the load when there is a loss of power from the primary utility power source.

6. The standby power system of claim 5, wherein the notification system monitors power provided by a primary utility power source.

7. The standby power system of claim 6, wherein the primary utility power source is an electrical utility.

8. The standby power system of claim 6, wherein the notification system receives information regarding potential interruptions of power that is provided by the primary utility power source.

9. The standby power system of claim 5, wherein the generator controller exchanges data with the notification system via the Internet.

10. The standby power system of claim 5, further comprising a server that exchanges information with the generator controller via the network, wherein at least one of the server and the generator controller determine that there may be a potential loss of power from the primary utility power source based on data received from the notification system.

11. A standby power system comprising:
    a sensor adapted to monitor characteristics of power supplied to a load by a utility power source;
    a generator configured to supply power to the load, wherein the generator includes an internal combustion engine that drives an alternator; and
    a generator controller configured to operate the generator and receive data from the sensor;
    wherein the generator controller is configured to predict, based on the received data, a loss of power from the utility power source before the loss of power from the utility power source occurs; and
    wherein the generator controller is configured to perform, before the loss of power from the utility power source occurs, and before the engine is started in order to minimize a time to availability for the generator to supply power to the load when there is a loss of power from the primary utility power source, at least one of: (i) operating an oil pump to lubricate mechanical components in the internal combustion engine, (ii) activating heating elements that enhance combustion in the internal combustion engine, (iii) operating air inlet louvers on an enclosure for the generator to permit the flow of combustion and cooling air to the internal combustion engine, (iv) injecting a fluid for combustion into the internal combustion engine to permit quicker starting of the internal combustion engine, or (v) activating fuel preparation equipment to improve starting of a combustion engine without starting the internal combustion engine.

\* \* \* \* \*